United States Patent [19]

Nagano

[11] Patent Number: 4,751,852
[45] Date of Patent: Jun. 21, 1988

[54] SPEED CONTROL DEVICE

[75] Inventor: Masashi Nagano, Izumi, Japan

[73] Assignee: Shimano Industrial Company Limited, Osaka, Japan

[21] Appl. No.: 909,592

[22] Filed: Sep. 22, 1986

[30] Foreign Application Priority Data

Sep. 26, 1985 [JP] Japan ................... 60-213439

[51] Int. Cl.⁴ .................. G05G 1/04; G05G 5/06; B60K 20/00
[52] U.S. Cl. ........................ 74/523; 74/527; 74/475
[58] Field of Search ............. 74/527, 523, 531, 539, 74/540, 489, 475, 502.2, 501.6; 192/48.1, 48.3; 280/289 H, 236; 474/82

[56] References Cited

U.S. PATENT DOCUMENTS 3,913,947 10/1975 Harris ........................ 280/236
4,343,201 8/1982 Shimano ..................... 74/475
4,586,396 5/1986 Nagano ...................... 74/475

FOREIGN PATENT DOCUMENTS 0006021 12/1979 European Pat. Off. ......... 280/236
2717304 11/1977 Fed. Rep. of Germany ...... 280/236
2531243 2/1984 France ..................... 280/236
417183 1/1947 Italy ...................... 74/594.2

*Primary Examiner*—Gary L. Smith
*Assistant Examiner*—Vinh Luong
*Attorney, Agent, or Firm*—Stevens, Davis, Miller & Mosher

[57] ABSTRACT

The device includes a positioning mechanism for setting the speed change stage of a lever body, a change-over mechanism for changing over the postioning mechanism between an operating position and a non-operating position, and a resistance applying mechanism for applying to the lever body a rotational resistance overcoming a return spring of a derailleur at the non-operating position of the positioning mechanism. The device also includes an adjusting mechanism for adjusting the rotational resistance of the lever body against the return spring of the derailleur.

10 Claims, 3 Drawing Sheets

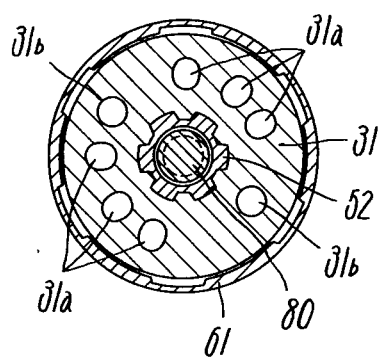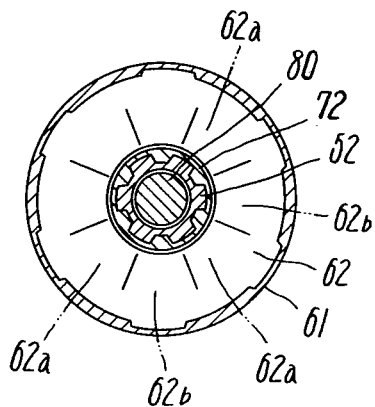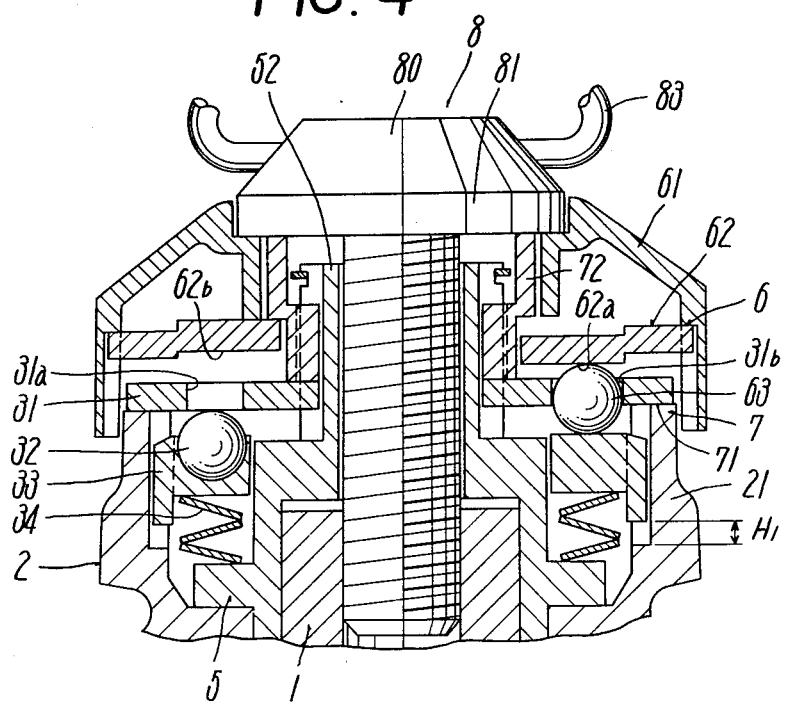

SPEED CONTROL DEVICE

FIELD OF THE INVENTION

The present invention relates to a speed control device used mainly for a bicycle, and more particularly, to a speed control device which supports a lever body to a fixing member fixed to the bicycle frame, the lever body being rotated to actuate a derailleur, thereby changing the bicycle speed to a predetermined speed change stage.

BACKGROUND OF THE INVENTION

Conventional speed control devices include a fixing member for securing the device to the bicycle frame and rotatably to the fixing member the lever body for actuating the derailleur. The lever body is rotatably supported to the fixing member. As is well known the device includes a positioning mechanism comprising a positioning member having a plurality of engaging portions, an engaging member engageable with one of the engaging portions, and a spring for biasing the engaging member toward the engaging portions, and a friction mechanism for applying to the lever body a rotational resistance against a return spring of the derailleur.

The conventional speed control device has independently either the positioning mechanism or the friction mechanism, but a device building in both the mechanisms has not been proposed. However, the present inventor has previously proposed a device provided with a positioning mechanism and a change-over mechanism having an operating member for changing over a positioning member of the positioning mechanism from the operating position thereof to the non-operating position, so that when the operating member is operated to change over the positioning member to the non-operating position, the lever body is given a rotational resistance against the return spring of the derailleur.

Accordingly, the above device can desirably select a case where the positioning mechanism is used to set the respective speed change stages for changing the speed and that where the positioning mechanism is not used but rotational resistance is given to the lever body, thereby changing the bicycle speed at a desired operating position of the lever body. For example, even when a control wire expands, its length is not adjusted, but the device is changed over to the speed control by the rotational resistance or friction, thereby enabling accurate speed control.

The above device can change over the positioning mechanism to the operation position and the non-operating position, but the positioning mechanism and change-over mechanism are incorporated together with the lever body in the fixing member by forwardly screwing a clamping bolt, whereby the operating member is limited to its operation range. Hence, the resistance against engagement of the engaging member with the engaging portion of the positioning member and the rotational resistance given to the lever body when the positioning mechanism is changed over to its non-operating position, are nearly decided, so that a high processing accuracy is required for each component and it is difficult to adjust the engaging resistance and rotational resistance as desired.

SUMMARY OF THE INVENTION

An object of the invention is to provide a speed control device which is capable of changing over by the change-over mechanism the positioning mechanism to its operating position and non-operating position, and of desirably adjusting the resistance against engagement of the engaging portions with the engaging member engageable with one of the engaging portions at the positioning mechanism and/or the rotational resistance, in other words, friction to overcome the return spring at the derailleur.

In detail, the speed control device of the present invention, which is provided with a fixing member and a lever body supported rotatably thereto for operating the derailleur having a return spring, is provided with (1) a positioning mechanism provided with a positioning member having a plurality of engaging portions, at least one engaging member engageable with one of the engaging portions, and a spring for biasing the engaging member toward the engaging portions; (2) a change-over mechanism having an operating member for changing over the positioning member or the engaging member of the positioning mechanism to its operating position where the positioning mechanism operates and its non-operating position where the same does not operate; (3) a resistance applying mechanism which, when the positioning mechanism is changed over to the non-operating position, applies to the lever body a rotational resistance overcoming the return spring at the derailleur; and (4) an adjusting mechanism, separate from the change-over mechanism, for adjusting the rotational resistance applied to the lever body against the return spring of the derailleur, in other words, the resistance against engagement of the engaging member with the engaging portion of the positioning mechanism and/or the rotational resistance given to the lever body by the resistance applying mechanism.

Thus, the speed control device of the present invention operates the operating member of the change-over mechanism to change over the positioning mechanism to its operating position and non-operating position, so that the speed change is carried out by setting the speed change by the positioning mechanism. When the positioning mechanism is changed over to its non-operating position, the speed change is carried out on the basis of the rotational resistance applied to the lever body by the resistance applying mechanism. Moreover, the adjusting mechanism can desirably adjust the resistance against engagement of the engaging member with the engaging portion and/or the rotational resistance applied to the lever body.

The above and further objects and novel features of the invention will be more fully apparent from the following detailed description when the same is read in connection with the accompanying drawings:

BRIEF DESCRIPTION OF THE DRAWINGS

FIG. 2 is a cross-sectional view of a positioning member in the FIG. 1 embodiment, FIG. 3 is a cross-sectional view of a cam body in the FIG. 1 embodiment, FIG. 4 is an enlarged partial sectional view of the FIG. 1 embodiment, in which an engaging member is changed over to the non-operating position thereof.

DETAILED DESCRIPTION OF THE INVENTION

Figure 1:
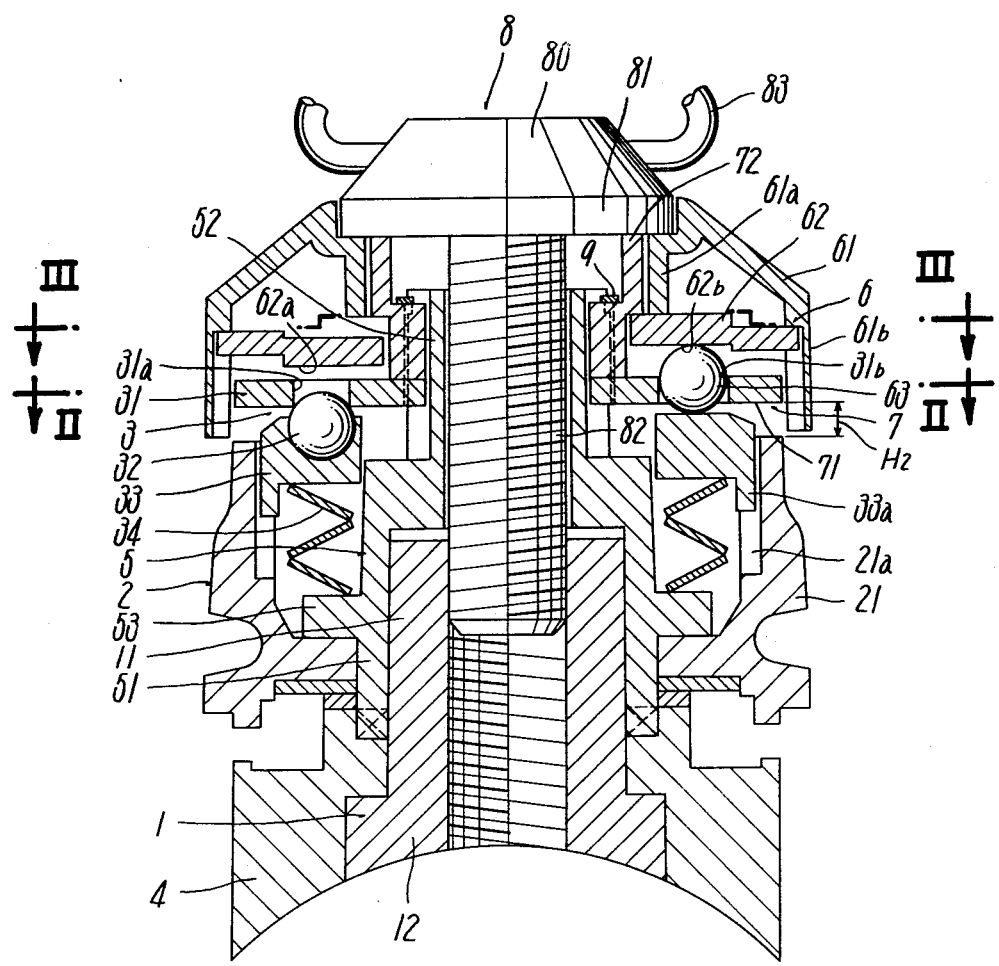
FIG. 1 is an enlarged longitudinal sectional view of an embodiment of a speed control device of the present invention.

Referring to FIG. 1, a fixing member 1 is provided with a fixing portion 12 fixed to the bicycle frame by means of, for example, welding, and a lever shaft 11 rotatably supporting a lever body 2 which operates a derailleur having a return spring. Fixing portion 12 non-rotatably supports thereon a cylindrical adapter 4. On lever shaft 11 is detachably fitted a bush 5 comprising a larger diameter shaft portion 51 and a smaller diameter shaft portion 52 having at its outer periphery axially extending splines. Larger diameter shaft portion 51 is retained at one end non-rotatably to the adapter 4.

The lever body 2 comprises a boss 21 having a through bore and a control portion (not shown) extending radially outwardly from one side of the boss 21. Boss 21 is supported rotatably to the larger diameter shaft portion 51 at the bush 5.

The bush 5 incorporates in unit a positioning mechanism 3 for setting the operating portion of the lever body 2, a change-over mechanism 6 to be discussed below, and a resistance applying mechanism 7 for applying to the lever body 2 a rotational resistance overcoming the return spring at the derailleur.

The positioning mechanism 3 comprises a disc-like positioning member 31 having a plurality of engaging portions 31a corresponding to the speed change stages at the derailleur, at least one engaging member 32 engageable with one of the engaging portions 31a, an annular holder 33 for holding the engaging member 32, and a spring 34 for biasing the engaging member 32 toward the engaging portions 31a. Positioning member 31 is supported to the smaller diameter shaft portion 52 at the bush 5 to be non-rotatable and axially movable relative thereto. Holder 33 is supported to the larger diameter shaft portion 51 to be rotatable and axially movable relative thereto. Spring 34 is interposed between the holder 33 and a larger diameter portion 53 formed at an intermediate portion of the larger diameter shaft portion 51. A plurality of projections 33a are provided at the outer periphery of the holder 33, and recesses 21a engageable with the projections 33a are provided at the inner periphery of the through bore at the boss 21 so that the holder 33, and in turn the engaging member 32, rotates in association with the lever body 2.

The change-over mechanism 6 changes over the positioning member 31 or the engaging member 32, that is, the positioning member in the FIG. 1 embodiment, to an operating position and a non-operating position of the positioning mechanism 3. Changeover mechanism 6 comprises an operating member 61, a disc-like cam body 62 interposed between the operating member 61 and the positioning member 31 and having high cam surfaces 62a and low cam surfaces 62b, and a pusher 63 preferably in the form of a ball. Pusher 63 is interposed between the cam body 62 and the holder 33 so as to move the holder 33 from the engaging position of the engaging member 32 to the disengaging position thereof. The operating member 61 has a smaller diameter cylindrical portion 61a and a larger diameter cylindrical portion 61b. Smaller diameter cylindrical portion 61a is fitted onto the smaller diameter shaft portion 52. Cam body 62 is held non-rotatably at the inner periphery of the larger diameter cylindrical portion 61b, and the pusher 63 is inserted into the through bore 31b at the positioning member 31, thereby transmitting a rotating force of the operating member 61 from the cam surface of cam body 62 to the holder 33 through the pusher 63. Hence, the engaging member 32 held to the holder 33 is moved in the direction of disengaging from the positioning member 31.

In addition, the cam body 62, as shown in FIG. 3, has thereon alternately disposed high cam surfaces 62a and low cam surfaces 62b located circumferentially on cam body 62 to form a continuously wavy configuration.

The resistance applying mechanism 7 of the embodiment shown in the drawings serves to apply a rotational resistance to the lever body 2 by utilizing the changeover of the positioning mechanism 3 from its operating position to its non-operating position. Resistance applying mechanism 7 comprises a friction operating portion 71 provided at the outer peripheral portion of the positioning member 31, with portion 71 contacting the end of the boss 21 at the lever body 2 to apply to the lever body 2 a resistance against its rotation, when the positioning mechanism 3 is changed over to the non-operating positions thereof, e.g., as shown in FIG. 4.

In addition, the resistance applying mechanism 7 may alternatively be used also as an adjusting mechanism 8 to be discussed below.

The adjusting mechanism 8 adjusts the rotational resistance of the lever body 2 against the return spring of the derailleur, that is, the resistance against engagement of the engaging member 32 with the engaging portion 31a of the positioning member 31 and/or the rotational resistance applied by the resistance applying mechanism 7 to the lever body 2. Adjusting mechanism 8 comprises an adjuster 80 to screw with a threaded bore formed at the lever shaft 11 at the fixing member 1.

The adjuster 80 comprises a head or control part 81 having a substantially C-shaped handle 83 and a screw bolt having a screw thread 82 screwable with the threaded bore at the lever shaft 11. Between the head or control part 81 and the positioning member 31 is provided a transmission cylinder 72 for transmitting to the positioning member 31 the movement of the adjuster 80 in the direction of adjustment. Transmission cylinder 72 is fitted non-rotatably and axially movably onto the outer periphery of the smaller diameter shaft portion 52 at the bush 5. When the adjuster 80 screws forwardly, the positioning member 31 is moved through the transmission cylinder 72 to thereby adjust the resistance against engagement of the engaging member 32 with the engaging portion 31a and also adjust the rotational resistance to be applied to the lever body 2 when the positioning mechanism 3 is changed over to its non-operating position.

In addition, it is possible that when the change-over mechanism 6 changes over the positioning mechanism 3 to its non-operating position, the friction operating portion 71 at the positioning member 31 is adapted to make contact with the boss 21 of lever body 2 to thereby adjust the rotational resistance by the adjuster 80. Alternatively, the positioning member 31, when the changeover mechanism 6 changes over the positioning mechanism 3 to its non-operating position, may not make contact with the boss 21, or, even when in contact therewith, may apply to the lever body 2 a rotational resistance insufficient to overcome the return spring of the derailleur, and the adjuster 80 may be operated to apply to the lever body 2 the rotational resistance overcoming the return spring.

In this case, the adjuster 80, in other words, the adjusting mechanism 8, serves also as the resistance applying mechanism 7.

In FIGS. 1 and 4, reference numeral 9 designates a snap ring retained to one end of the smaller diameter shaft portion 52 at the bush 5. The snap ring 9 constitutes a holding means for holding to the bush 5 the positioning mechanism 3, change-over mechanism 6 and transmission cylinder 72, in unitary fashion, whereby the respective mechanisms, when incorporated together with the lever body 2 into the fixing member 1, are easy to assemble.

Figure 5:
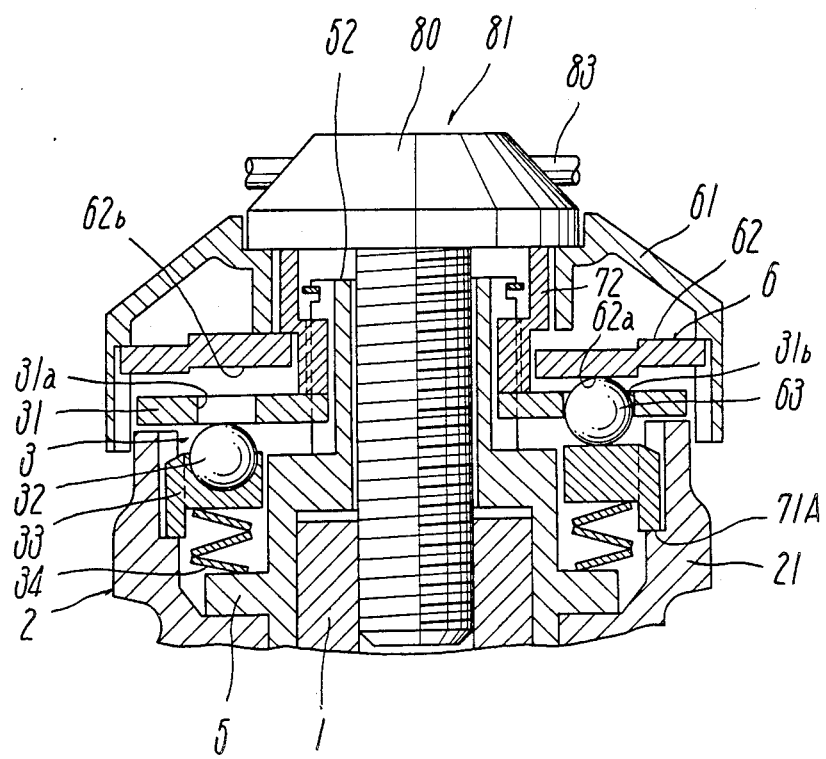
FIG. 5 illustrates a holder for the engaging member having a frictional operating portion.

FIG. 5 shows a holder 33 with a frictional operating portion 71A. This shows positioning mechanism 3 switched to its non-operating position via changeover mechanism 6 to cause frictional operating portion 71A formed at holder 33 to be brought into contact with the stepped end surface at the inside of boss 21 of lever body 2, thereby applying a resistance against rotation of lever body 2.

Referring again to FIG. 1, the positioning mechanism 3 is in its operation state so that the engaging member 32 engages with one engaging portion 31a and the pusher 63 engages with the low cam surface 62b at the cam body 62. When the lever body 2 is rotated in the state shown in FIG. 1, the engaging member 32 held on the holder 33 rotates together with the lever body 2 to an extent of the pitch between the respective engaging portions 31a with respect to the positioning member 31, thereby holding the lever body 2 in a proper position set by the positioning mechanism 3.

Next, in a case where the engaging member 32 is changed over from its operating position to its non-operating position to apply to the lever body 2 a rotational resistance against the return spring of the derailleur, the operating member 61 at first is rotated at an angle of, for example, 90° with cam body 62 being rotated together with the operating member 61, thereby engaging the high cam surface 62a with the pusher 63. Thus, the holder 33 moves against the spring 34 to disengage the engaging member 32 from the engaging portion 31a, thereby changing over the engaging member 32 to its non-operating position. In this case, when the rotational resistance of the lever body 2 is not enough to overcome the return spring at the derailleur, the adjuster 80 is screwed forwardly to lower the transmission cylinder 72 and the positioning member 31 is moved toward the boss 21 of lever body 2, thereby pushing the friction operating portion 71 at the outer periphery of positioning member 31 against the end face of the boss 21.

When the mode of applying to the lever body 2 the predetermined rotational resistance is changed over to that of operating the positioning mechanism 3, the adjuster 80, when adjusted, is unscrewed and also the operating member 61 is reversely rotated at an angle of, for example, 90°, so that the operating member 61 rotates to allow the cam body 62 to rotate. Then, a restoring force of the spring 34 moves the holder 33 toward the positioning member 31, thereby engaging the engaging member 32 with the engaging portion 31a.

In a case of adjusting the rotational resistance between the engaging member 32 and the engaging portion 31a when the positioning mechanism 3 is in its operating position, the adjuster 80 is, for example, screwed forwardly, whereby the holder 33 holding the transmission cylinder 72 and engaging member 32, is moved while engaging the engaging member 32 with the engaging portion 31a, so as to deflect the spring 34 and increase a spring force applied by it against holder 33. In this case, since the adjuster 80 is operated independently of the operating member 61, the positional relationship between the engaging portion 31a and the engaging member 32 is reliably maintained.

In the above construction, when the adjuster 80 is operated to apply the predetermined rotational resistance to the lever body 2, a margin $H_1$ for adjustment shown in FIG. 4 is ensured. Also, when the adjuster 80 is operated to adjust the engaging resistance created between the engaging member 32 and the engaging portion 31a, a margin $H_2$ for adjustment shown in FIG. 1 is ensured. Hence, the components, such as the positioning mechanism 3, resistance applying mechanism 7 and adjusting mechanism 8, need not be processed with high accuracy, thereby facilitating the processing and assembly of these components to that extent.

In the aforesaid embodiment, the engaging member 32 is adapted to be changed over from the operating position to the non-operating position of the positioning mechanism 3. Alternatively, the positioning member 31 may be changed over in a similar manner.

Also, the engaging member 32 is caused to move in association with the lever body 2 through the holder 33, and the positioning member 31 having the engaging portions 31a is supported at the fixing member 1 side. Alternatively, these members may be arranged vice versa, i.e., engaging member 1 can be supported to fixing member 1 while positioning member 31 can be caused to move in association with lever body 2.

The engaging member 32 is in the form of a roller as shown in FIG. 1, and may alternatively be integral with, for example, the holder 33, whereby the positioning mechanism 3 is not limited to the specific construction shown in the figures.

Also, the change-over mechanism 6 used in the embodiment is not limited to the construction shown.

Alternatively, the adjusting mechanism 8 may be adapted to adjust only the engaging resistance of the engaging member 32 to the engaging portion 31a, or only the rotational resistance applied to the lever body 2.

Alternatively, the operating member 61 can be utilized to apply by its rotation to the lever body 2 a predetermined rotational resistance simultaneously with the change-over of the positioning mechanism 3 to its non-operating position. Thus, construction of the resistance applying mechanism 7 is not particularly defined.

As seen from the above, the present invention (1) operates the operating member 61 of change-over mechanism 6 to enable the positioning member 31 or the engaging member 32 to be changed over from the operating position of the positioning mechanism 3 to the non-operating position thereof, (2) applies by the resistance applying mechanism 7 to the lever body 2 a rotational resistance overcoming the return spring of the derailleur, and (3) adjusts by the adjusting mechanism 8 the rotational resistance against the return spring, that is, the engaging resistance of the engaging member 32 to the engaging portion 31a at the positoning mechanism 3 and/or the rotational resistance applied to the lever body 2 by the resistance applying mechanism 7. The invention therefore ensures that the rotational resistance applied to the lever body 2 can be adjusted without strict processing accuracy for the respective components. Moreover, proper adjustment, even when the rotational resistance varies after long use, can be performed to enable effective use of the device for long periods.

While a preferred embodiment of the invention has been described using specific terms, such description is for illustrative purpose only, and it is to be understood that changes and variations may be made without departing from the spirit or scope of the following claims.

What is claimed is:

1. A speed control device adapted to operate a bicycle derailleur having a return spring, said speed control device comprising:
   (a) a fixing member,
   (b) a lever body supported rotatably with respect to said fixing member and adapted to actuate said derailleur,
   (c) a positioning mechanism comprising (i) a positioning member having a plurality of engaging portions, (ii) at least one engaging member selectively engageable with individual ones of said engaging portions, and (iii) a spring biasing said engaging member to said engaging portions, said positioning mechanism having an operating mode in which said positioning member sets speed change stages of said derailleur by controlling engagement between said engaging member and said engaging portions,
   (d) a change-over mechanism having an operating member which changes over one of said positioning member and said engaging member to an operating position in which said positioning mechanism is in said operating mode and a non-operating position in which said positioning mechanism is in a non-operating mode,
   (e) a resistance applying mechanism which applies to said lever body a rotational resistance adapted to overcome said return spring of said derailleur, in response to said positioning mechanism being placed in said non-operating mode, and
   (f) an adjusting mechanism for adjusting said rotational resistance applied to said lever body by said resistance applying mechanism against said return spring of said derailleur.

2. A speed control device according to claim 1, wherein said operating member is supported rotatably with respect to said fixing member and said change-over mechanism further comprises a cam body rotatable with said operating member and having cam surfaces to disengage said engaging member and said engaging portion of said positioning member of said positioning mechanism.

3. A speed control device according to claim 2, wherein said change-over mechanism further comprises a pusher engageable with said cam surfaces of said cam body and actuated by rotational operation of said cam body so as to move said positioning member and said engaging member of said positioning mechanism out of engagement with each other.

4. A speed control device according to claim 3, wherein said positioning mechanism further comprises a holder which holds said engaging member, one of said holder and said positioning member being movable away from the other of said holder and said positioning member responsive to operation of said pusher.

5. A speed control device according to claim 4, wherein an outer peripheral portion of one of said holder and said positioning member is provided with said resistance applying mechanism comprising a friction operating portion which contacts said lever body to apply thereto a resistance against rotation of said lever body when said change-over mechanism changes over said positioning mechanism to said non-operating position thereof.

6. A speed control device according to claim 1, wherein said adjusting mechanism has an adjuster which has a screw thread screwably engageable with said fixing member and a control part, said control part being rotatably operated to adjust a resistance against engagement of said engaging member with said engaging portion of said positioning mechanism.

7. A speed control device according to claim 6, wherein said adjusting mechanism is provided with a transmission cylinder for transmitting movement of said adjuster to one of said positioning member and said engaging member of said positioning mechanism.

8. A speed control device according to claim 6, wherein said positioning member said positioning mechanism is provided with said resistance applying mechanism comprising a friction operating portion which contacts said lever body to apply thereto a rotational resistance responsive to said change-over mechanism changing over said positioning mechanism to said non-operating mode thereof, so that when said positioning mechanism is changed over to said non-operating mode, said adjuster of said adjusting mechanism also adjusts the rotational resistance to be applied to said lever body.

9. A speed control device according to claim 1, wherein said adjusting mechanism is provided with an adjuster having a screw thead screwably engageable with said fixing member and a control element, said control element being operated to adjust the rotational resistance applied to said lever body by said resistance applying mechanism.

10. A speed control device according to claim 1, further comprising a bush mounted detachably and non-rotatably to said fixing member, said bush having a holding means for holding said positioning mechanism and said change-over mechanism together as a unit.

* * * * *